US007811168B2

(12) United States Patent
Parham et al.

(10) Patent No.: US 7,811,168 B2
(45) Date of Patent: Oct. 12, 2010

(54) RANDOM PAY GAMING SYSTEM USING WEIGHTING FUNCTION WITH MAXIMUM, MINIMUM, AND AVERAGE VALUE

(75) Inventors: Tyler Thomas Parham, Reno, NV (US); Richard E. Michaelson, Reno, NV (US); William K. Bertram, Reno, NV (US)

(73) Assignee: Gaming Enhancement, Inc., Reno, NV (US)

( * ) Notice: Subject to any disclaimer, the term of this patent is extended or adjusted under 35 U.S.C. 154(b) by 0 days.

(21) Appl. No.: 10/378,052

(22) Filed: Feb. 27, 2003

(65) Prior Publication Data

US 2006/0089196 A1 Apr. 27, 2006

Related U.S. Application Data

(63) Continuation-in-part of application No. 09/916,242, filed on Jul. 25, 2001, now Pat. No. 6,626,758.

(60) Provisional application No. 60/220,488, filed on Jul. 25, 2000, provisional application No. 60/437,426, filed on Jan. 2, 2003, provisional application No. 60/360,043, filed on Feb. 27, 2002.

(51) Int. Cl.

| | |
|---|---|
| ***A63F 13/10*** | (2006.01) |
| ***G06F 19/00*** | (2006.01) |
| ***G06Q 50/00*** | (2006.01) |
| *A63F 13/12* | (2006.01) |
| *A63F 5/04* | (2006.01) |
| *G07F 17/34* | (2006.01) |

(52) U.S. Cl. .............................. 463/27; 463/25; 463/26

(58) Field of Classification Search ..................... 463/1, 463/12–28, 40–42
See application file for complete search history.

(56) References Cited

U.S. PATENT DOCUMENTS

| | | | | | |
|---|---|---|---|---|---|
| 2,090,526 | A | * | 8/1937 | Eaton | 200/81.5 |
| 2,217,394 | A | * | 10/1940 | Wengel | 73/585 |
| 2,393,622 | A | * | 1/1946 | Adams et al. | 290/17 |
| 2,404,614 | A | * | 7/1946 | Borst | 363/52 |

(Continued)

FOREIGN PATENT DOCUMENTS

AU 2006244145 11/2006

(Continued)

OTHER PUBLICATIONS

"Scarne's Encyclopedia of Card Games," by John Scarne, 1973 HarperCollins, chapter on Blackjack.*

(Continued)

*Primary Examiner*—Peter DungBa Vo
*Assistant Examiner*—Matthew D. Hoel
(74) *Attorney, Agent, or Firm*—Brian N. Young; Fountainhead Law Group PC

(57) ABSTRACT

A method of providing a game for a gaming device using random payout from a prize pool, the game including a plurality of possible game outcomes, is provided. The method comprises: receiving, at the gaming device, a wager amount; receiving an input to initiate game play; and qualifying the wager amount to win a random award from the prize pool for each of at least two game outcomes from the plurality of game outcomes.

74 Claims, 1 Drawing Sheet

U.S. PATENT DOCUMENTS 2,470,738 A * 5/1949 Bach .......................... 310/315
3,495,076 A * 2/1970 Jespers et al. ............... 708/445
4,332,389 A 6/1982 Loyd
4,448,419 A 5/1984 Telnaes
4,582,324 A 4/1986 Koza et al.
4,837,728 A * 6/1989 Barrie et al. .................. 463/27
4,861,041 A * 8/1989 Jones et al. ................. 273/292
5,016,880 A 5/1991 Berge
5,042,810 A 8/1991 Williams
5,078,405 A 1/1992 Jones et al.
5,116,055 A * 5/1992 Tracy .......................... 463/27
5,275,400 A 1/1994 Weingardt
5,280,909 A * 1/1994 Tracy .......................... 463/27
5,324,035 A * 6/1994 Morris et al. ................. 463/42
5,332,219 A * 7/1994 Marnell et al. ................ 463/13
5,344,144 A * 9/1994 Canon ......................... 463/27
5,364,104 A 11/1994 Jones et al.
5,401,023 A * 3/1995 Wood .......................... 463/13
5,417,430 A * 5/1995 Breeding .................... 273/292
5,475,851 A * 12/1995 Kodosky et al. ............ 715/763
5,481,740 A * 1/1996 Kodosky ..................... 715/839
5,481,741 A * 1/1996 McKaskle et al. ........... 345/522
5,483,444 A 1/1996 Heintzeman et al.
5,497,500 A * 3/1996 Rogers et al. ............... 717/109
5,504,917 A * 4/1996 Austin ........................ 345/522
5,544,893 A 8/1996 Jones et al.
5,573,244 A 11/1996 Mindes et al.
5,584,485 A 12/1996 Jones et al.
5,626,341 A 5/1997 Jones et al.
5,655,961 A 8/1997 Acres et al.
5,702,304 A 12/1997 Acres et al.
5,707,285 A * 1/1998 Place et al. ................... 463/12
5,727,786 A 3/1998 Weingardt
5,741,183 A 4/1998 Acres et al.
5,743,800 A * 4/1998 Huard et al. .................. 463/26
5,752,882 A 5/1998 Acres et al.
5,779,547 A 7/1998 SoRelle et al.
5,794,964 A 8/1998 Jones et al.
5,795,225 A 8/1998 Jones et al.
5,816,918 A 10/1998 Kelly
5,820,459 A 10/1998 Acres et al.
5,836,817 A 11/1998 Acres et al.
5,842,921 A 12/1998 Mindes et al.
5,873,782 A 2/1999 Hall
5,876,284 A 3/1999 Acres et al.
5,885,158 A * 3/1999 Torango et al. ............... 463/27
5,911,418 A * 6/1999 Adams ....................... 273/274
5,913,726 A 6/1999 Jones et al.
5,941,773 A * 8/1999 Harlick ........................ 463/26
6,032,955 A 3/2000 Luciano et al.
6,045,130 A 4/2000 Jones et al.
6,062,981 A 5/2000 Luciano
6,070,878 A 6/2000 Jones et al.
6,073,930 A 6/2000 Jones et al.
6,089,976 A 7/2000 Schneider et al.
6,110,043 A * 8/2000 Olsen .......................... 463/27
6,139,430 A * 10/2000 Huard et al. .................. 463/16
6,146,270 A 11/2000 Huard et al.
6,146,273 A * 11/2000 Olsen .......................... 463/27
6,162,122 A 12/2000 Acres et al.
6,179,710 B1 * 1/2001 Sawyer et al. ................ 463/16
6,210,276 B1 * 4/2001 Mullins ....................... 463/27
6,217,448 B1 4/2001 Olsen
6,224,482 B1 * 5/2001 Bennett ...................... 463/20
6,231,445 B1 * 5/2001 Acres .......................... 463/42
6,254,483 B1 * 7/2001 Acres .......................... 463/26
6,319,125 B1 * 11/2001 Acres .......................... 463/25
6,327,351 B1 12/2001 Walker
6,336,859 B2 1/2002 Jones et al.
6,358,149 B1 * 3/2002 Schneider et al. ............ 463/27
6,375,567 B1 4/2002 Acres
6,413,161 B1 7/2002 Baerlocher et al.
6,416,409 B1 7/2002 Jordan
6,434,534 B1 8/2002 Walker et al.
6,435,511 B1 * 8/2002 Vancura et al. ............. 273/292
6,435,968 B1 8/2002 Torango
6,443,452 B1 9/2002 Brune
RE37,885 E 10/2002 Acres et al.
6,471,591 B1 10/2002 Crumby
6,475,088 B1 11/2002 Jones et al.
6,485,368 B2 11/2002 Jones et al.
6,506,116 B1 1/2003 Sunaga
6,506,118 B1 1/2003 Baerlocher et al.
6,565,434 B1 5/2003 Acres
6,575,830 B2 6/2003 Baerlocher et al.
6,588,747 B1 * 7/2003 Seelig ..................... 273/138.1
6,589,114 B2 * 7/2003 Rose ........................... 463/20
6,589,115 B2 * 7/2003 Walker et al. ................. 463/25
6,594,640 B1 7/2003 Postrel
6,599,192 B1 7/2003 Baerlocher et al.
6,599,193 B2 7/2003 Baerlocher et al.
6,602,137 B2 8/2003 Kaminkow et al.
6,609,974 B2 8/2003 Mead et al.
6,626,758 B1 9/2003 Parham et al.
6,634,946 B1 10/2003 Bridgeman et al.
6,638,167 B1 * 10/2003 Sawyer et al. ................. 463/26
6,656,048 B2 12/2003 Olsen
6,663,489 B2 12/2003 Baerlocher
6,666,766 B2 12/2003 Baerlocher et al.
6,687,679 B1 2/2004 Van Luchene et al.
6,712,693 B1 * 3/2004 Hettinger ..................... 463/20
6,712,695 B2 3/2004 Mothwurf et al.
6,719,632 B2 4/2004 Palmer et al.
6,726,563 B1 4/2004 Baerlocher et al.
6,733,386 B2 5/2004 Cuddy et al.
6,758,749 B2 * 7/2004 Krintzman ................... 463/25
6,758,750 B2 7/2004 Baerlocher et al.
6,761,632 B2 7/2004 Bansermer et al.
6,776,711 B1 8/2004 Baerlocher
6,783,458 B2 8/2004 Mead et al.
6,786,819 B2 9/2004 Baerlocher et al.
6,793,579 B2 9/2004 Baerlocher et al.
6,796,905 B2 9/2004 Baerlocher et al.
6,811,483 B1 11/2004 Webb et al.
6,817,944 B2 11/2004 Kaminkow et al.
6,830,514 B2 * 12/2004 Meyer et al. .................. 463/17
6,852,027 B2 2/2005 Kaminkow et al.
6,852,030 B2 2/2005 Baerlocher et al.
6,905,407 B2 6/2005 Nordman
6,916,245 B1 7/2005 Vanura
6,960,133 B1 11/2005 Marks et al.
6,966,834 B1 * 11/2005 Johnson ....................... 463/25
6,971,955 B2 12/2005 Baerlocher et al.
6,979,263 B2 12/2005 Baerlocher et al.
6,985,879 B2 1/2006 Walker et al.
7,001,273 B2 2/2006 Baerlocher
7,001,278 B2 2/2006 Maya et al.
7,033,270 B2 * 4/2006 Baerlocher et al. ............ 463/16
7,040,982 B1 * 5/2006 Jarvis et al. .................... 463/9
7,056,210 B2 6/2006 Bansemer et al.
7,070,505 B2 7/2006 Vancura
7,121,943 B2 * 10/2006 Webb et al. ................... 463/25
7,169,044 B2 1/2007 Baerlocher et al.
7,172,506 B2 2/2007 Baerlocher et al.
7,357,716 B2 4/2008 Marks
7,392,224 B1 6/2008 Bauer
7,430,521 B2 9/2008 Walker
2001/0018361 A1 * 8/2001 Acres .......................... 463/27
2001/0036857 A1 11/2001 Mothwurf
2001/0037243 A1 11/2001 Rouston
2001/0039511 A1 11/2001 Duckworth
2001/0049298 A1 * 12/2001 Bennett ....................... 463/16
2001/0055990 A1 * 12/2001 Acres .......................... 463/25
2002/0039923 A1 4/2002 Cannon

| | | | | |
|---|---|---|---|---|
| 2002/0058546 | A2* | 5/2002 | Acres | 463/25 |
| 2002/0169660 | A1 | 11/2002 | Taylor | |
| 2003/0003989 | A1* | 1/2003 | Johnson | 463/25 |
| 2003/0013513 | A1 | 1/2003 | Rowe | |
| 2003/0052452 | A1* | 3/2003 | Spur et al. | 273/292 |
| 2004/0002376 | A1* | 1/2004 | Swift et al. | 463/25 |
| 2004/0078263 | A1 | 4/2004 | Altieri | |
| 2005/0075889 | A1 | 4/2005 | Gomes | |
| 2005/0096113 | A1* | 5/2005 | Gabuchian | 463/16 |
| 2006/0089196 | A1 | 4/2006 | Parham | |
| 2006/0160612 | A1 | 7/2006 | Parham | |
| 2006/0205499 | A1* | 9/2006 | Jarvis et al. | 463/30 |
| 2006/0205501 | A1* | 9/2006 | Jarvis et al. | 463/30 |
| 2006/0211469 | A1* | 9/2006 | Jarvis et al. | 463/16 |
| 2006/0277100 | A1 | 12/2006 | Parham | |
| 2008/0051194 | A1 | 2/2008 | Parham | |
| 2008/0058096 | A1 | 3/2008 | Parham | |
| 2008/0076543 | A1 | 3/2008 | Parham | |
| 2008/0102942 | A1 | 5/2008 | Parham | |
| 2008/0102943 | A1 | 5/2008 | Parham | |
| 2009/0197674 | A1 | 8/2009 | Parham | |

FOREIGN PATENT DOCUMENTS

| | | | |
|---|---|---|---|
| CN | 101283371 | A | 10/2008 |
| EP | 0 944 030 | A2 * | 9/1999 |
| JP | 54-074472 | A * | 6/1979 |
| WO | 2004/060510 | A1 | 7/2004 |
| WO | 2006/066251 | A2 | 6/2006 |
| WO | 2006/122044 | A1 | 11/2006 |

OTHER PUBLICATIONS

Derwent abstract for DE 19812546 C1.*

International Search Report for WO 2006/066251 A1, application PCT/US2005/046141.*

"Scarne's Encyclopedia of Card Games," by John Scarne, 1973 HarperCollins, chapter on Poker.*

"The statistical distribution of the maxima of a randon function," Cartwright, et al., Proceedings of the Royal Society of London, Series A, Mathematical and Physical Sciences, vol. 237, No. 1209, pp. 212-232, Oct. 9, 1956, downloaded from http://www.jstor.org/stable/100074 on Apr. 14, 2010.*

* cited by examiner

RANDOM PAY GAMING SYSTEM USING WEIGHTING FUNCTION WITH MAXIMUM, MINIMUM, AND AVERAGE VALUE

CROSS-REFERENCES TO RELATED APPLICATIONS

This application claims priority from both U.S. Provisional Application No. 60/360,043, entitled "Random Prize Pool Awarding Method", filed on Feb. 27, 2002 and U.S. Provisional Application No. 60/437,426, entitled "Randomly Generated Weighted Prize Pool Awarding Methods", filed on Jan. 2, 2003, and is a Continuation-in-Part of U.S. application Ser. No. 09/916,242, entitled "Random Pay Gaming Method", filed on Jul. 25, 2001, which claims priority from U.S. Provisional Application No. 60/220,488, entitled "Random Pay Gaming Method", filed on Jul. 25, 2000, all of which are herein incorporated by reference in its entirety for all purposes.

BACKGROUND OF THE INVENTION

The present invention is related generally to gaming systems and more specifically to a gaming device system and method for awarding payouts and prizes.

Conventional gaming devices for awarding payouts when a wager is taken at a casino for example, are well known. A gaming device uses a random selection process to determine the game outcome of each play of a game. When a gaming device correctly displays at least one randomly predetermined set of indicia, the player is awarded a predetermined payout that is displayed in a payout schedule.

Conventional gaming devices have a top award called a jackpot that is limited by the probability of aligning a finite number of jackpot indicia. In order for a gaming device to remain profitable over time, the amount of awards multiplied by the probability of winning the awards is less than the average amount wagered in winning the awards. In order for a gaming device to payout a large predetermined jackpot, for example, $100,000, the odds of winning the jackpot must be extremely low in order for the machine to be profitable over time. Because of this, it normally takes long periods of time between large jackpot payouts. Even though players are still attracted to the opportunity of winning a $100,000 dollars, disadvantageously, because of the low frequency of winners and the extremely low probability of winning, players tend to lose interest in playing and tend to move on to games that have a higher frequency of winning a jackpot.

Conventional progressive gaming systems have been used to produce progressive pools, ranging from thousands to millions of dollars by using a progressive gaming system in conjunction with a gaming device or devices. In most of these systems, a number of gaming devices and/or location are coupled to a central computer system. As wagers are placed in the gaming devices, a portion of each wager is contributed to at least one progressive pool. As contributions are made to the progressive pool, the size of the pool grows until it is awarded to a player. When the player properly aligns a predetermined set of indicia on the gaming device the entire pool is paid. These progressive amounts are displayed on the gaming device and/or showcased on a display above the individual gaming device or a group of gaming devices.

While the above gaming devices and progressive gaming system with its added progressive pool have proved satisfactory in stimulating game play on the coupled gaming devices, disadvantageously, it has been observed that game play tends to decrease immediately after the total progressive pool has been won. Not until the displayed current pool value increases considerably above the initially reset base value does game play increase to its more usual levels. This fall-off in game play is a result of the players on the gaming devices being reluctant to institute game play when the displayed current pool value is close to the initial base value, since the players know that the value will likely increase to a more substantial level. Fall-off in game play at any time is undesirable and detracts from the benefits of the added progressive gaming system.

It should be noted that increased payoffs are being demanded by the market to maintain and increase player appeal. Nevertheless, the probability of win and payout that allows for a reasonable business profit must be assured to casino owners. Generally the profit-hold objectives before taxes and operational costs that are deducted are in a range as low as 2.7% and generally up to 15%. Hence, the higher payoffs for a winning indicia combination is counterbalanced with less probability for the high win combination of indicia.

Disadvantageously, the probability of hitting a large progressive award on a gaming device i.e., Mega Bucks/IGT "the worlds biggest slot Jackpot"™, is extremely low, thus causing long periods of time to pass by, between winners, of the large progressive award pools. Even though players are still attracted to the chance of winning over a million dollars, because of the low frequency of winners and the extremely low probability of winning, players tend to lose interest in playing and tend to move on to games that have higher odds frequency of winning jackpots.

In addition, progressive pools increase as wagers are placed in the gaming devices, a portion of each wager is contributed to at least one progressive pool. As contributions are made to the progressive pool, the size of the pool grows until it is awarded to a player. Because a portion of the wager from each gaming device is the only way to contribute to the progressive pool, when game play (coin-in) decreases the progressive pool increments at a slower rate, causing less excitement and player appeal. Disadvantageously, because of this and fall-off, progressive pools can remain stagnant for long periods of time creating a loss in revenues for the Gambling Establishments.

BRIEF SUMMARY OF THE INVENTION

Embodiments of the present invention generally relate to awarding random awards at a gaming device. In one embodiment, a method of providing a game for a gaming device using random payout from a prize pool, the game including a plurality of possible game outcomes, is provided. The method comprises: receiving, at the gaming device, a wager amount; receiving an input to initiate game play; and qualifying the wager amount to win a random award from the prize pool for each of at least two game outcomes from the plurality of game outcomes.

In another embodiment, a method of providing a game for a gaming device using random payout from a progressive prize pool, the game including a plurality of possible game outcomes, is provided. The method comprises: receiving, at the gaming device, a wager amount; receiving an input to initiate game play; and qualifying the wager amount to win a random award from the progressive prize pool and a total amount of the progressive prize pool.

In yet another embodiment, a method for providing random payout from a progressive prize pool is provided. The method comprises: storing a predetermined average pool size for the progressive prize pool; and providing a random payout such that an amount of an average random payout is equal to the average contributions to the progressive prize pool in order to maintain the progressive prize pool at the predetermined average pool size.

In another embodiment, a method for providing a random payout from a progressive prize pool is provided. The method comprises: storing a predetermined average pool size for the progressive prize pool; receiving a wager amount; receiving an input to initiate game play; determining if the progressive prize pool is equal to the predetermined average pool size; if the progressive prize pool is equal to the predetermined pool size, qualifying the wager for a random payout such that an amount of an average random payout is equal to the average contributions to the progressive prize pool in order to maintain the progressive prize pool at the predetermined average pool size; and if the progressive prize pool is less than the predetermined pool size, qualifying the wager for a random payout such that an amount of an average random payout is less than the average contributions to the progressive prize pool in order to increase the progressive prize pool to the predetermined average pool size.

In another embodiment, a gaming network having a gaming device, a computing device and a prize pool containing a portion of wager amounts received at the gaming device, a method of awarding payouts from the prize pool is provided. The method comprises: receiving, by the gaming device, a wager amount; receiving an input to initiate game play; allocating a portion of the wager amount to the progressive prize pool; and qualifying the wager amount to win a random award, the random award being randomly selected, wherein the random award is determined using a function that awards random awards between a minimum value and a maximum value, wherein the random awards determined are substantially equal to an average value.

A further understanding of the nature and advantages of the present invention herein may be realized by reference to the remaining portions of the specification and the attached drawings. Reference to the remaining portions of the specification, including the drawing and claims, will realize other features and advantages of the present invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Figure 1:
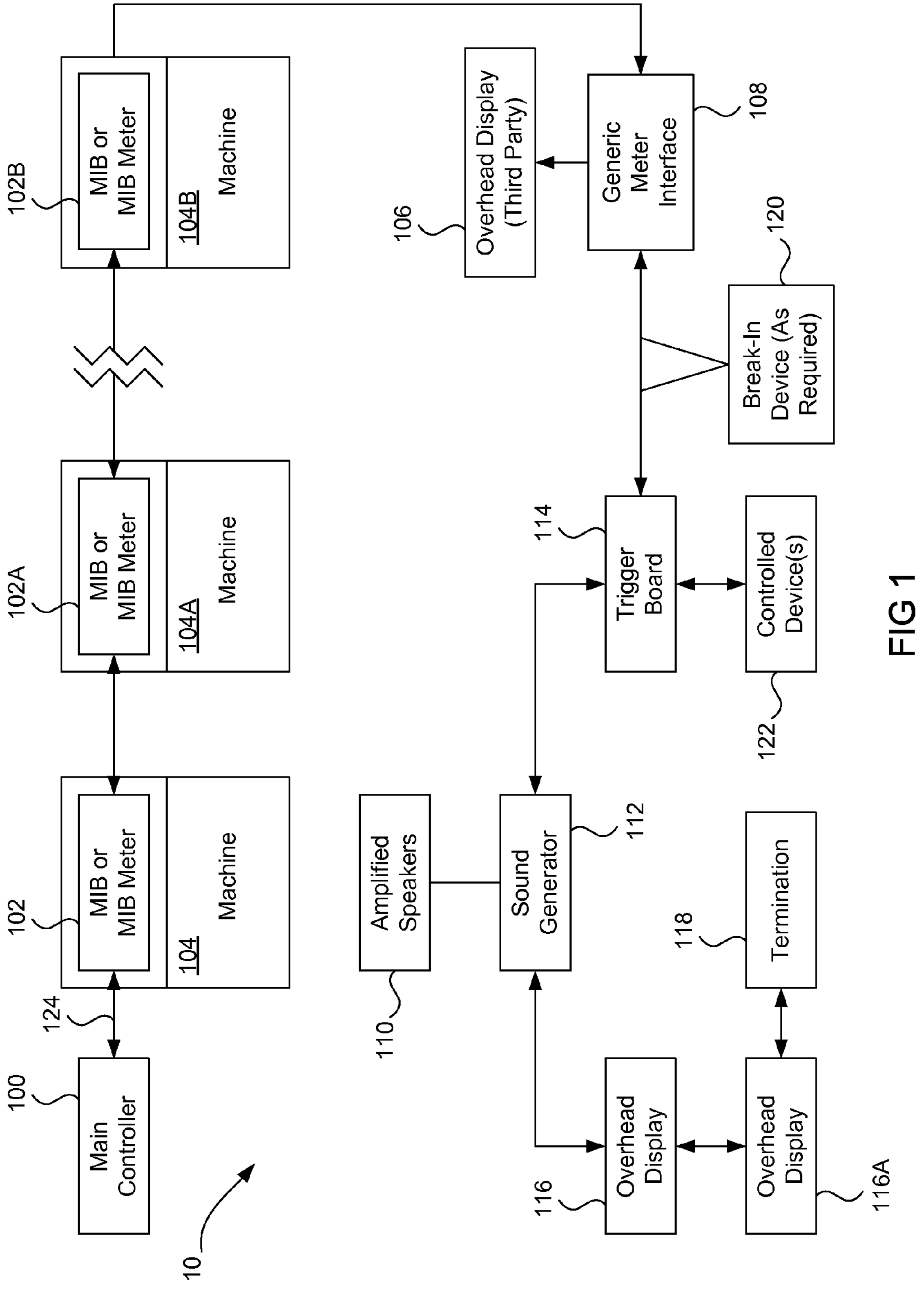
FIG. 1 is a block diagram of a conventional gaming system for awarding payouts and prizes, the system being modifiable as proves necessary for implementing the various embodiments of the present invention.

Various embodiments of the present invention are disclosed with the common thread being that once a player bets at least one proper wager amount and initiates game play. The player becomes eligible to win one or more (randomly selected monetary awards as a function of a random number from 0 to 100% of a prize pool) on any participating gaming device before, during or after game play with or without regard to game outcome. The prize pool may be fixed or progressive.

In a first embodiment of the present invention, RPGM (random pay gaming method) is implemented as part of any novel programmable electronic or computer-controlled gaming devices that offer a game payout, that can be used in conjunction with a typical networked gaming system. The novel gaming device, preferably has various output devices, including a display screen for displaying aspects of RPGM as described more thoroughly below. Other output devices may include audio outputs such as speakers, bells, whistles and the like, and signaling devices such as controllable lights and the like.

A number of types of input devices can be used by which the user can place wagers and/or play the game, including touch screen input devices, joysticks, mouse input devices, keyboards, buttons, levers and the like, as well as coin or currency acceptors and/or validators, card readers such as credit card readers, or other encoded-card readers. In a further embodiment, gaming terminals may be provided with communication devices, e.g., for purposes for accounting, maintenance, management, security, controls, updating and the like. It is common in the gaming industry to provide for novel gaming devices and those with skill in the art will understand how to construct and program such novel gaming devices to implement RPGM after reading and understanding the present descriptions.

FIG. 1 is a block diagram of a conventional gaming system 10 for awarding payouts and prizes. Among other components, gaming system 10 comprises a programmable controller 100; one or more gaming devices 104, 104A, 104B; one or more programmable Machine Interface Boards 102, 102A, 102B; one or more overhead displays 116, 116A or an existing display 106 with a generic display interface 108; an optional sound units 112; one or more trigger board units 114; and one or more "break in" devices 120 for system programming on the casino floor. Gaming system 10 may be utilized for implementing the present invention with various modifications as proves necessary to implement the invention.

In an alternate embodiment, the RPGM is implemented on one or more existing electronic or computer-controlled gaming devices. One or more gaming devices 104, 104A are coupled to a programmable controller 100 over a communication network 124, which could be any suitable serial or parallel bus arrangement. Indeed, any communication link 124 could be utilized under the method of the present invention and a programmable (controller) 100 could be located remotely from or within the gaming devices 104, 104A. At each gaming device 104 is a programmable machine interface board 102 that interfaces between the conventional electronic circuitry of gaming device 104 and the communication network 124.

In this embodiment, with a need for no more than relatively minor modifications, any conventional electronic or computer-controlled gaming devices e.g. video games, spinning reel slot games, keno games, live card games with tables interfacing with electronic equipment, Internet and/or networked games, etc. that receives bets in order to play a game at the machine is contemplated to be used, under the methods of the present invention. The design and operation of gaming devices is well known and conventional gaming machines are available such as from International Gaming Technology™ and Bally™. Modifications to previous gaming devices for use in accordance with embodiments of the present invention can include, e.g., providing graphics, instructions, harnessing, prize indications and the like to inform players how to play the game, meter displays, etc. Furthermore, the controller 100 can be any suitable computer-based controller.

Controller 100 used can be any of a number of different controllers and computer based processing systems. How controller 100 communicates with each gaming machine 104 over the communication network 124 is a matter of design choice and the protocols of communication are determined by the nature of the communication network 124 and the corresponding interface circuits.

Controller 100 may optionally be connected over communication link 124 to another computer system, not shown. Furthermore, the network 124 in some embodiments is a telecommunications network such as a phone link, intranet, Internet, satellite, etc. In these embodiments, the gaming devices are implemented as game software in personal computers which are located in remote locations such as hotel/motel rooms, homes, etc. It is common in the gaming industry to provide for electronic gaming devices which will be appreciated by those skilled in the art, how to construct and program such networked gaming systems to implement the RPGM according to the present invention after reading and understanding the present descriptions.

As noted, among other components, RPGM employs a gaming device 104, a Controller 100, and means of displaying a fixed or progressed distinct monetary prize pool amount on gaming device 104 and/or on the video screen (not shown) of gaming device 104 and/or showcased on a display 116 or 106 above the individual gaming device 104 or a group of gaming devices 104. Additional devices may be connected to generate sounds and indicators of win to stimulate play.

Any conventional means or any combination of any conventional means to display the entire amount of a monetary prize pool can be utilized under the method of the present invention which will be appreciated by those skilled in the art, such as in-game display meter video screen of gaming device 104, overhead display, plasma screen, etc.

Once a player bets the proper wager and initiates game play on any participating gaming device, the player becomes eligible to win one or more randomly selected monetary awards from the prize pool. Any conventional eligibility requirements or any combination of any conventional eligibility requirements can be utilized under the method of the present invention which will be appreciated by those skilled in the art, such as rate of play, max wager, insertion of player cards, one or more predetermined indicia, separate wager bet, etc.

The Random Pay Gaming Method utilizes a random number generator located in a machine interface board, controller 100 or in the gaming device 104 to randomly select one or more monetary awards as a function of a random number from 0 to 100% of a fixed or progressed prize pool with or without regard to game outcome.

The monetary prize pool award that the player is eligible to win may or may not be displayed to the player prior to winning the prize pool award. For example, the prize pool award that the player is eligible to win can be display on the gaming devices monitor screen or in-game meter prior to winning the prize pool award. Or the prize pool award can be displayed as indicia and not be displayed until after the player selects the proper winning indicia.

In one embodiment in order to ensure player awareness, a predetermined amount minimum for the selected predetermined winning indicia for that gaming device is displayed. An award table and/or conventional display means on gaming device 104 always shows a predetermined minimum amount for the player. Once the player bets the proper wager an additional amount determined by a random number generator is displayed on a separate conventional display or added to the conventional display showing the minimum amount on the gaming device. The predetermined minimum amount is the amount of the gaming devices predetermined payout for the selected predetermined winning set of indicia, but a player also has the opportunity to win a bonus that is a randomly selected award from the prize pool.

In another embodiment the monetary prize pool award that the player is eligible to win is not displayed to the player until after the player has achieved a winning game outcome or completed certain bonus mode criteria. If the player wins a prize pool award, the payout, can be "paid out" by any conventional payout means which will be appreciated by those skilled in the art, such as by gaming device 104 through a currency chute or by increasing the amount of winnings shown in a credit window (not shown) of a gaming device and/or a hand pay by an attendant, etc. As noted, the prize pool may be fixed or progressive.

If the prize pool is fixed, a predetermined minimum and maximum prize pool awards and a predetermined balancing point (average award) are stored in controller 100. In order for the controller 100 to calculate the randomly selected awards in the range of 0 to 100% of the prize pool.

If the prize pool is progressive, a controller 100 calculates the randomly selected awards from a minimum up to the maximum of the progressive prize pool, so that the randomly selected awards are less than or equal to the contributions to the progressive prize pool in order for the progressive prize pool to increase to a larger size before the entire progressive prize pool is won.

If the prize pool is progressive, controller 100 increments a predetermined percentage of each gaming wager from one or more gaming devices and/or a percentage of non-gaming revenues e.g., rooms, food, beverage, etc., to the total progressive prize pool amount.

If the player wins a progressive prize pool award, the amount of the progressive prize pool won is deducted from the amount showing on the progressed prize pool display. The amount not won from the progressive prize pool remains displayed and the amount not won is carried over for the next opportunity to win an award from the progressive prize pool. The progressive prize pool is reset to a predetermined monetary base value only after a player wins 100% of the prize pool.

If gaming devices with different pay tables and/or denominations are playing for the same prize pool awards, main controller 100 will also store hit frequency and wager information from each gaming device 104 coupled to the networked gaming system so that the award algorithm will display amounts that average properly for each machine.

When the RPGM is used on an existing gaming device that already has a predetermined pay table, in order for the RPGM to function properly, a predetermined prize pool top award (maximum), a predetermined minimum award, and a predetermined balancing point (average award) are stored in controller 100. In order for the controller 100 to calculate the randomly selected awards in the range of 0 to 100% of the entire prize pool, the percentage of the prize pool awarded is a function of a random number such that the randomly selected awards, awarded over a number of plays equals the designed jackpot award of gaming device 104 being played.

For example, a gaming device has a designed top award of $10,000, a minimum jackpot pay amount of $5,000 and a jackpot pool amount of $100,000. In order for the sum of the minimum jackpot amount ($5,000) and the average pool award to equal the designed jackpot award of $10,000, the sum of expectations of jackpot pool awards above $5,000 must equal the sum of expectations of jackpot pool awards below $5,000 in order for the designed pay table award of $10,000. Expectation is the product of the amount awarded times the probability of winning that award as defined by the random number generator.

A method of calculating a percentage of jackpot pool is such that the percentage in the range [0%-100%] is a function f(x) of a random number x in an interval [0,1]. The function f(x) is such that for some value p in the interval [0,1], the sum of expectations for awards f(x) for values of x less that p must equal the sum of expectations for awards f(x) for values of x greater than p and the value of f(p) must equal the desired average jackpot award. Expectations may be defined by discrete values in a table of award percentages or a continuous function may be used.

The function $f(x)=ae^{-cx}$ meets these requirements for appropriate values of a and c. For example, if a=102*JPavg and c=199 a maximum jackpot of 102 times average may be offered. A value greater than JPavg will be offered as a bonus whenever the random number x is less than 0.0266. Although not shown, one of ordinary skill in the art will understand that other functions consistent with the scope and spirit of the present invention may be utilized. For example, a function may include at least two parameters and is normalized over an interval of desired award values. In one example, an exponential weighted function, A exp(−BJ), where A and B are parameters and J is the random award value, is provided. A minimum value of a desired award, a maximum value of the desired award, and an average value is specified and stored. Using these values, the parameters of the weighted function can be calculated, i.e., the values of A and B in the above function.

Now that the weighted function is determined, a weighted random award value is determined between the minimum and maximum values specified, and whose value over time will result in an average value that agrees with the above specified average value. In this embodiment, these random award values may be chosen by picking a random number that yields a random value award J between the minimum and maximum values.

Unlike conventional gaming devices, the above function allows award of jackpots that are larger than the pay table was originally designed to pay when used with existing gaming devices.

In an alternate embodiment, the player invests the required amount into gaming device 104 and initiates game play. At the time gaming device 104 receives the required wager amount to qualify the player for the prize pool award, a controller 100 calculates a randomly selected monetary award amount of the prize pool and this amount is displayed on gaming device 104 for this play only. If gaming device 104 based on its internal workings, selects the proper predetermined set of winning indicia the player is awarded a predetermined amount minimum for the selected predetermined winning set of indicia. Furthermore, the player is also rewarded the award of the prize pool amount displayed on gaming device 104. If gaming device 104 does not select the proper predetermined set of winning indicia to win the prize pool amount displayed on gaming device 104. The display on gaming device 104 will change to the minimum amount for that machine and/or display various attractions to stimulate game play.

In one embodiment a prize award is selected from at least one prize pool. The prize award selected is then divided into two or more prize points and/or awards. The two or more prize points and/or awards are then displayed as items in a secondary video game (SVG) for the player(s) to win and/or lose. After the SVG comes to an end, the prize awards won are subtracted from the prize pool and the SVG will provide means through a computer system for the player(s) to verify and collect the prize points and/or awards won.

In another embodiment when the player invests the required wager amount into a video gaming device (not shown) and initiates game play, the player becomes eligible to win one or more progressive bonus awards from a randomly selected bonus award of the progressive prize pool with or without regard to game outcome. In this embodiment, a novel feature is that the bonus awards, non-bonus awards and game terminators are displayed as indicia and randomly appear and disappear and/or move across the video monitor screen and the player has the opportunity to win the awards by touching and exposing (through video touch screen technology) as many of the indicia as possible before the bonus award cycle ends and/or the player touches a bonus cycle terminator.

When a controller 100 increments to the progressive prize pool one or more predetermined monetary amounts of contribution from one or more video gaming devices and/or non-gaming revenues, main controller 100 triggers a bonus cycle. Controller 100 then randomly selects one monetary bonus award from the prize pool and divides it into one or more bonus awards, then randomly selects one or more non-bonus awards and randomly selects 0 or more bonus cycle terminators.

Once controller 100 has randomly selected one or more bonus awards and has selected one or more non-bonus awards and has selected 0 or more bonus cycle terminators, controller 100 detects which of the video gaming devices on the networked gaming system has received the required wager amount. Once controller 100 has identified the qualified video gaming machines, controller 100 then randomly selects at least one of the qualified video gaming devices on the network gaming system for a random bonus cycle. After the controller 100 has selected at least one of the qualified video gaming device, controller 100 transfers this information to the properly programmed video gaming device and triggers and bonus cycle for at least one gaming device.

The properly programmed video gaming device then displays the bonus award percentages, non-bonus awards, and game terminators as indicia (e.g., card back, ducks, balloons, etc.). Gaming device 104 then resumes the bonus cycle and the disguised indicia randomly appear and disappear and/or move across the video monitor screen, before, during or after game play. The rate of speed that the indicia randomly appear and disappear and/or move across the video monitor screen is a pre-selected rate that is stored in the video gaming machine. As the indicia randomly appear and disappear and/or move across the video monitor screen, the player has the opportunity to win the disguised bonus awards by touching and exposing (through video touch screen technology) as many of the bonus indicia as possible before the bonus award cycle ends and/or the player touches a bonus cycle terminator. The bonus awards exposed by the player on the gaming machines video screen are awarded to the player once the bonus cycle comes to an end. The bonus awards won are then deducted from the total amount of the progressed prize pool.

The bonus cycle comes to an end once the randomly selected indicia all disappear from the gaming machines video screen. The bonus cycle comes to an end also when a bonus cycle terminator is exposed. The bonus cycle comes to an end also when a player exposes a bonus award that is 100 percent of the entire prize pool. Once a player wins 100 percent of the progressed prize pool, the prize pool will be reset to a predetermined monetary base value. The bonus cycles have no effect on gaming device 104's normal game play outcome.

In another embodiment the player provides the required amount into a video gaming device and initiates game play. If gaming device 104 based on its internal workings, selects one or more predetermined winning indicia, the player qualifies for a secondary bonus game. The bonus game works similar to the bonus game described above except for, the indicia that are displayed on gaming device 104 are static. For example, five card back are displayed on gaming device 104, which are disguising the randomly selected bonus awards, non-bonus awards and game terminators. At this time the player has the opportunity to select and expose the bonus awards, non-bonus awards and game terminators. The bonus cycle come to an end once all the card backs are exposed or the player selects a game terminator or 100% of the entire bonus prize pool is won. The player is awarded the bonus awards once the bonus game comes.

In a further embodiment of the one just described above, once the player has qualified for a bonus award for example, the five card backs are displayed to the player for selection. The player is given the option to bet on one or more opportunities to win a bonus prize pool award. If the player chooses to bet a predetermined wager on extra bonus opportunities, then five more card backs are displayed with the other five card back. This process is carried on until the player decides to quite betting or reaches a set limit to the number of bonus opportunities available. Once the player is ready to begin the bonus game, The player can select any of the card backs in any order that the player desires. The bonus cycle come to an end once all the card backs are exposed or the player selects a game terminator or 100% of the entire bonus prize pool is won. The player is awarded the bonus awards once the bonus game comes to an end through conventional means.

Yet in a further embodiment, when the player has qualified for a bonus award, each time the player bet on the opportunities to win another bonus prize pool award, the total percentage of previous bonus prize pool opportunity is shown to the player. The player has a chance to see what the total percentage of the prize pool hidden behind the disguised indicia is before trying to win it.

In one embodiment, controller 100 may provide random awards generated from a prize pool, such as a progressive prize pool. When a gaming device 104 receives a wager and game play is initiated, the wager is qualified for a random award from the prize pool. The random awards may be generated where the prize pool is maintained at a predetermined average pool size. Thus, once the average prize pool is at the predetermined average pool size, the average prize pool is maintained. In one embodiment, the average pool size is maintained by making the average random award equal to the average contribution rate over a number of game plays. In one embodiment, the random awards are awarded based on functions provided above. The average award is governed by the function and the contribution rate may be set at the average award.

The average prize pool, however, may not always be at the predetermined average pool size. For example, the average prize pool at a time of play, such as right after the entire prize pool has been won, may be less than the predetermined average prize pool. In this case, the average random award over a number of game plays can be less than the contribution rate. The average prize pool will then increase until the predetermined prize pool size is reached. The average prize pool may then be maintained at the predetermined prize pool size.

The above method continuously maintains the prize pool at a average prize pool amount in addition to determining random awards of all sizes. Also, no initial start amount for the prize pool is required because the prize pool will increase while still providing random awards.

In another embodiment, controller 100 provides random awards for at least two game outcomes from a single prize pool, such as a progressive prize pool. When a wager is received at gaming device 104 and game play is initiated, the wager amount is qualified to win a random award for at least two game outcomes. The game may include any number of game outcomes. For example, game outcomes for a video poker game include a royal flush outcome, straight flush outcome, four of a kind outcome, etc. Each game outcome may have a random weighted award associated with it.

In one embodiment, the random weighted award for each game outcome is determined in a way that keeps the average pool size at a predetermined pool size. As mentioned above, the parameters of a weighted function may be determined so that the average value of the random awards equals the average contribution to the prize pool when the prize pool is at the predetermined pool size. In the case where random awards are given for multiple outcomes, different outcomes have different contribution rates to the single prize pool. The average value of the random award for each outcome is determined by taking the taking the ratio of the desired pool size to the average contribution for that outcome. For example, if there are three outcomes that have different contribution rates, by dividing up the three random awards equally gives the average award as: (⅓)*Pool Size/contribution rate. If the contribution rate is different for each outcome, then the average random award for each outcome will be different using the above formula. This will then maintain the average pool size at the desired value. Although the above formula is discussed, it will be understood that other methods of determining the average random award for each outcome may be used.

In another embodiment, the average random awards for each outcome may be randomly distributed among outcomes. For example, the average random award for a straight flush may be randomly used for a random award for a four-of-a-kind. In this case, the four-of-a-kind average random award would be larger because the average random award for a straight flush is larger than for a four-of-a-kind.

If these random awards are then randomly distributed among all outcomes, the average pool size cannot be guaranteed to stay the same because ultimately if larger average random awards are used for typical average random awards for the outcome, the contribution rates will be lower than the average random awards. Thus, a two-step algorithm including a normal mode and random mode is used. The normal mode is where average random awards will be less than the contribution rate thereby letting the pool increase. The random mode is where random average awards for outcomes are random, which may cause the pool to decrease. In one example, controller 100 would operate in the normal mode until the pool exceeds a preset size at which time the random mode would start and distribute the awards randomly. If and when the pool drops below another preset value, the normal mode would then begin and build the pool back up.

In yet another embodiment, controller 100 provides a single prize pool, such as a progressive prize pool, that includes at least two outcomes. One outcome provides an opportunity for a player to win at least one random award (there may be an opportunity to win multiple random awards) from the single prize pool and another outcome provides the player with an opportunity win a total amount (100%) of the single prize pool. The total amount is a non-random win. For example, a royal flush will win the total amount of the pool and other outcomes, such as a straight flush, four-of-a-kind, etc., will win a random amount within the ranges specified from the same prize pool. Thus, in the case of a progressive prize pool, when gaming device 104 receives a wager and game play is initiated, the wager is qualified for a chance to win the entire progressive amount of the progressive prize pool if a certain outcome is received and is given a chance to win at least one random award if another certain outcome is received.

In the case of the progressive prize pool, the random awards provided may be set where the average contribution to the prize pool is greater than the average random award to allow the progressive prize pool to increase until the total amount is won. Also, in another embodiment, as described above, the prize pool may be maintained at a predetermined level. In one embodiment, in order to determine the average 100% award, the following calculation may be used. Let n1 be the average number of games needed to hit the whole pool, and n2 be the average number of games for the random award. If the average contribution to the pool during these n2 games is C and the average random award is A, then C−A is the average contribution during these games. So the pool will continue to grow and will result in an average 100% award of (n1/n2)*(C−A). This means that the average random award is fixed by the parameter selection of the function used, and will stay the same regardless of the pool size.

While the above is a complete description of exemplary specific embodiments of the invention, additional embodiments are also possible. For example, the RPGM may relate to any novel or conventional electronic or computer-controlled gaming devices e.g. video games, spinning reel slot games, keno games, etc that offer a primary game payout and a secondary prize pool payout that can be used in conjunction with a typical networked gaming system, and may be used for a promotional device, state lottery or non-gaming environment for prize give a ways. Thus, the above description should not be taken as limiting the scope of the invention, which is defined by the appended claims along with their full scope of equivalents.

The invention claimed is:

1. A method of providing a game for a gaming device using random payout from a prize pool, the game including a possible plurality of ranked game outcomes, the method comprising:

determining, for at least two ranked game outcomes, a first programmer input of information based on a first specified average value, a first specified minimum award value, and a first specified maximum award value, the first specified average value being between the first specified minimum award value and first specified maximum award value, and a second programmer input of information based on a second specified average value, a second specified minimum award value, and a second specified maximum award value, the second specified average value being between the second specified minimum award value and second specified maximum award value;

receiving, at the gaming device, a wager amount;

receiving an input to initiate game play of the game, wherein playing of the game can result in at least one of the possible plurality of ranked game outcomes occurring; and calculating, by the gaming device, a first weighted random amount from the prize pool using a function that calculates the first weighted random amount using the first specified minimum value, the first specified maximum value and the first specified average value, wherein the calculated first weighted random amount is generated between the first specified minimum value of the prize pool and the first specified maximum value of the prize pool, wherein the function is configured to calculate first weighted random amounts that average over time substantially the first specified average value;

calculating, by the gaming device, a second weighted random amount from the prize pool using the function, which calculates the second weighted random amount using the second specified minimum value, the second specified maximum value and the second specified average value, wherein the calculated second random amount is generated between the second specified minimum value of the prize pool and the second specified maximum value of the prize pool, wherein the function is configured to calculate second weighted random amounts that average over time substantially the second specified average value;

qualifying the wager amount to win at least one of the first weighted random amount and the second weighted random amount from the prize pool for the at least two ranked game outcomes from the plurality of ranked game outcomes; and displaying the at least one of the first and second random amounts from the prize pool.

2. The method of claim 1, wherein the prize pool is progressive.

3. The method of claim 1, wherein determining the first programmer input and the second programmer input comprising determining a plurality of programmer inputs specifying an average value for selected ranked game outcomes in the plurality of ranked game outcomes.

4. The method of claim 3, further comprising:

determining a contribution rate to the prize pool for each selected ranked game outcomes; and determining a prize pool size based on the specified average value for each selected ranked game outcomes.

5. The method of claim 4, wherein determining the plurality of programmer inputs specifying the average value for each ranked game outcome comprises using a number of possible game outcomes, the determined contribution rate of each ranked game outcome, and the determined prize pool size to determine the average value for each ranked game outcome.

6. The method of claim 1, further comprising using two modes to determine the random amount, wherein a first mode uses a mode that increases the prize pool and a second mode uses a mode that qualifies the wager amount to win the first random amount and the second random amount.

7. The method of claim 6, wherein the first mode is used until a first pool amount is reached and the second mode is used until a second pool amount is reached.

8. The method of claim 1, wherein the function comprises a continuous function.

9. The method of claim 1, wherein the gaming device is coupled to one or more gaming devices.

10. The method of claim 1, wherein the gaming device is coupled to a controller, the controller qualifying the wager.

11. The method of claim 1, wherein the first weighted random amount and the second weighted random amount are generated upon initiation of game play.

12. The method of claim 1, wherein the first and second range of values of the prize pool comprise monetary values.

13. The method of claim 1, wherein the function comprises an exponential function.

14. A gaming system for providing a game using random payout from a prize pool, the game including a possible plurality of ranked game outcomes, the system comprising:

a gaming device configured to receive a wager amount and an input to initiate game play of the game, wherein playing of the game can result in at least one of the possible plurality of ranked game outcomes occurring; and a controller, in response to the input, configured to:

determine, for at least two ranked game outcomes, a first programmer input of information based on a first specified average value, a first specified minimum award value, and a first specified maximum award value, the first specified average value being between the first specified minimum award value and first specified maximum award value, and a second programmer input of information based on a second specified average value, a second specified minimum award value, and a second specified maximum award value, the second specified average value being between the second specified minimum award value and second specified maximum award value;

calculate a first weighted random amount from the prize pool using a function that calculates the first weighted random amount using the first specified minimum value, the first specified maximum value and the first specified average value, wherein the calculated first weighted random amount is generated between the first specified minimum value of the prize pool and the first specified maximum value of the prize pool, wherein the function is configured to calculate first weighted random amounts that average over time substantially the first specified average value;

calculate a second weighted random amount from the prize pool using the function, which calculates the second weighted random amount using the second specified minimum value, the second specified maximum value and the second specified average value, wherein the calculated second random amount is generated between the second specified minimum value of the prize pool and the second specified maximum value of the prize pool, wherein the function is configured to calculate second weighted random amounts that average over time substantially the second specified average value; and qualify the wager amount to win at least one of the first weighted random amount and the second weighted random amount from the prize pool for the at least two ranked game outcomes from the plurality of ranked game outcomes.

15. The system of claim 14, wherein the prize pool is progressive.

16. The system of claim 14, wherein the controller is coupled to the gaming device through a network.

17. The system of claim 14, wherein the gaming device includes the controller.

18. The system of claim 14, wherein the controller comprises logic to, if each possible game outcome includes a specified average value, qualify the wager amount to win weighted random amounts for all of the possible ranked game outcomes.

19. The system of claim 18, wherein the controller comprises logic to use two modes to determine the first weighted random amount and the second weighted random amount, wherein a first mode uses a mode that increases the prize pool and a second mode uses a mode that qualifies the wager amount to win the first weighted random amount and the second weighted random amount.

20. The system of claim 19, wherein the controller comprises logic to switch between the first and second modes depending on a value of the prize pool.

21. The system of claim 14, wherein the first weighted random amount and the second weighted random amount are generated upon initiation of game play.

22. A method of providing a game for a gaming device using random payout from a progressive prize pool, the game including a possible plurality of game outcomes, the method comprising:

receiving, at the gaming device, a wager amount;

receiving an input to initiate game play of the game, wherein playing of the game can result in at least one of the possible plurality of game outcomes occurring;

determining a random amount using a function that calculates the random amount using a minimum amount, the total amount of the progressive prize pool, and a specified average value, wherein the random amount calculated by the function is included within the minimum and the total amount of the progressive prize pool, wherein the function is configured to output random amounts for the first outcome that average over time substantially the specified average value;

qualifying the wager amount to win the random amount from the progressive prize pool and a total amount of the progressive prize pool, wherein the random amount is awarded based on a first outcome in the plurality of game outcomes and the total amount is awarded based on a second outcome in the plurality of game outcomes, wherein the first outcome and the second outcome are predetermined winning outcomes based on possible game outcomes in the game play of the game; and displaying the random amount from the progressive prize pool.

23. The method of claim 22, wherein an average contribution rate to the prize pool is greater than an average award over a number of game plays.

24. The method of claim 22, further comprising:

storing a number of game plays required to pay out the total amount of the prize pool in a game play (N1);

storing a number of games required for the random amount (N2);

storing a contribution rate over an amount of games N2 (C);

storing an average random value over the amount of games (A); and wherein an average random amount awarded over the amount of games is equal to (N1/N2)*(C−A).

25. The method of claim 22, wherein a contribution rate is greater than the average value thereby increasing the prize pool until the total amount is won.

26. The method of claim 22, wherein the gaming device is coupled to one or more gaming devices.

27. The method of claim 22, wherein the gaming device is coupled to a controller, the controller qualifying the wager.

28. The method of claim 22, wherein the random amounts from the prize pool for each of at least two ranked game outcomes is generated upon initiation of game play.

29. A system for providing a game using random payout from a progressive prize pool, the game including a possible plurality of game outcomes, the system comprising:

a gaming device configured to receive a wager amount and an input to initiate game play of the game, wherein playing of the game can result in at least one of the possible plurality of game outcomes occurring; and a controller, in response to the input, configured to;

calculate a random amount using a function that calculates the random amount using a minimum amount, the total amount, and a specified average value, wherein the random amount calculated by the function is included within the minimum amount and the total amount, wherein the function is configured to calculate random amounts that average over time substantially the specified average value;

qualify the wager amount to win the random amount from the progressive prize pool and a total amount of the progressive prize pool, wherein the random amount is awarded based on a first outcome in the plurality of game outcomes and the total amount is awarded based on a second outcome in the plurality of game outcomes, wherein the first outcome and the second outcome are predetermined winning outcomes based on possible game outcomes in the game play of the game.

30. The system of claim 29, wherein the controller is coupled to the gaming device through a network.

31. The system of claim 29, wherein the gaming device includes the controller.

32. The system of claim 29, wherein a contribution rate is greater than the average value thereby increasing the prize pool until the total amount is won.

33. The system of claim 29, wherein the random amount from the prize pool is generated upon initiation of game play.

34. A gaming device for providing a game using random payout from a prize pool, the game including a possible plurality of ranked game outcomes, the gaming device comprising:

an input to receive a wager amount;

logic configured to determine, for at least two ranked game outcomes, a first programmer input of information based on a first specified average value, a first specified minimum award value, and a first specified maximum award value, the first specified average value being between the first specified minimum award value and first specified maximum award value, and a second programmer input of information based on a second specified average value, a second specified minimum award value, and a second specified maximum award value, the second specified average value being between the second specified minimum award value and second specified maximum award value;

logic configured to initiate game play of the game, wherein playing of the game can result in at least one of the possible plurality of ranked game outcomes occurring;

logic configured to calculate a first weighted random amount from the prize pool using a function that calculates the first weighted random amount using the first specified minimum value, the first specified maximum value and the first specified average value, wherein the calculated first weighted random amount is generated between the first specified minimum value of the prize pool and the first specified maximum value of the prize pool, wherein the function is configured to calculate first weighted random amounts that average over time substantially the first specified average value;

logic configured to calculate a second weighted random amount from the prize pool using the function, which calculates the second weighted random amount using the second specified minimum value, the second specified maximum value and the second specified average value, wherein the calculated second random amount is generated between the second specified minimum value of the prize pool and the second specified maximum value of the prize pool, wherein the function is configured to calculate second weighted random amounts that average over time substantially the second specified average value;

logic configured to cause the wager amount to be eligible to win at least one of the first weighted random amount from the prize pool for a first ranked game outcome in the plurality of possible ranked game outcomes and the second weighted random amount from the prize pool for a second ranked game outcome from the plurality of possible ranked game outcomes.

35. The gaming device of claim 34, further comprising logic to, if each possible ranked game outcome includes a specified average value, qualify the wager amount to win weighted random amounts for each of the possible ranked game outcomes.

36. The gaming device of claim 35, further comprising logic to use a two modes to determine the random amount, wherein a first mode uses a mode that increases the prize pool and a second mode uses a mode that qualifies the wager amount to win the first weighted random amount and the second weighted random amount.

37. The gaming device of claim 36, further comprising logic to switch between the first and second modes depending on a value of the prize pool.

38. The gaming device of claim 34, wherein the first weighted random amount and the second weighted random amount are generated upon initiation of game play.

39. A method of providing a game for a gaming device using random payout from a prize pool, the game including a possible plurality of possible ranked game outcomes, the method comprising:

determining, for at least two ranked game outcomes, a first programmer input of information based on a first specified average value, a first specified minimum award value, and a first specified maximum award value, the first specified average value being between the first specified minimum award value and first specified maximum award value, and a second programmer input of information based on a second specified average value, a second specified minimum award value, and a second specified maximum award value, the second specified average value being between the second specified minimum award value and second specified maximum award value;

receiving, at the gaming device, a wager amount;

receiving an input to initiate game play of the game, wherein playing of the game can result in at least one of the possible plurality of game outcomes occurring;

calculating, by the gaming device, a first weighted random amount from a prize pool using a function that calculates the first weighted random amount using the first specified minimum value, the first specified maximum value and the first specified average value, wherein the calculated first weighted random amount is generated between the first specified minimum value of the prize pool and the first specified maximum value of the prize pool, wherein the function is configured to calculate first weighted random amounts that average over time substantially the first specified average value;

calculating, by the gaming device, a second weighted random amount from the prize pool using the function, which calculates the second weighted random amount using the second specified minimum value, the second specified maximum value and the second specified average value, wherein the calculated second weighted random amount is generated between the second specified minimum value of the prize pool and the second specified maximum value of the prize pool, wherein the function is configured to calculate second weighted random amounts that average over time substantially the second specified average value; and causing the wager amount to be eligible to win at least one of the first weighted random amount from the prize pool for a first ranked game outcome in the plurality of possible ranked game outcomes and the second weighted random amount from the prize pool for a second ranked game outcome from the plurality of possible ranked game outcomes.

40. The method of claim 39, wherein receiving the wager amount comprises receiving the wager amount from a player, wherein causing the wager amount to be eligible comprises causing the player to be eligible to win the first weighted random amount and the second weighted random amount.

41. The method of claim 39, wherein the first weighted random amount and the second weighted random amount are generated upon initiation of game play.

42. A method of providing a game using random payout from a prize pool, the game including a possible plurality of possible ranked game outcomes, the method comprising:

determining, for at least two ranked game outcomes, a first programmer input of information based on a first specified average value, a first specified minimum award value, and a first specified maximum award value, the first specified average value being between the first specified minimum award value and first specified maximum award value, and a second programmer input of information based on a second specified average value, a second specified minimum award value, and a second specified maximum award value, the second specified average value being between the second specified minimum award value and second specified maximum award value;

qualifying a player for the game, wherein playing of the game can result in at least one of the possible plurality of ranked game outcomes occurring;

calculating, by a computing device, a first weighted random amount from the prize pool using a function that calculates the first weighted random amount using the first specified minimum value, the first specified maximum value and the first specified average value, wherein the calculated first weighted random amount is generated between the first specified minimum value of the prize pool and the first specified maximum value of the prize pool, wherein the function is configured to calculate first weighted random amounts that average over time substantially the first specified average value;

calculating, by the computing device, a second weighted random amount from the prize pool using the function, which calculates the second weighted random amount using the second specified minimum value, the second specified maximum value and the second specified average value, wherein the calculated second weighted random amount is generated between the second specified minimum value of the prize pool and the second specified maximum value of the prize pool, wherein the function is configured to calculate weighted second random amounts that average over time substantially the second specified average value; and causing the player to be eligible to win at least one of the first weighted random amount from the prize pool for a first ranked game outcome in the plurality of ranked game outcomes and the second weighted random amount from the prized pool for a second ranked game outcome from the plurality of ranked game outcomes.

43. The method of claim 42, wherein the first weighted random amount and the second weighted random amount are generated upon initiation of game play.

44. A method comprising:

determining, for at least two ranked game outcomes, a first programmer input of information based on a first specified average value, a first specified minimum award value, and a first specified maximum award value, the first specified average value being between the first specified minimum award value and first specified maximum award value, and a second programmer input of information based on a second specified average value, a second specified minimum award value, and a second specified maximum award value, the second specified average value being between the second specified minimum award value and second specified maximum award value;

qualifying a player for the game, wherein playing of the game can result in at least one of a possible plurality of ranked game outcomes occurring;

calculating, by a computing device, a first weighted random amount from the prize pool using a function that calculates the first weighted random amount using the first specified minimum value, the first specified maximum value and the first specified average value, wherein the calculated first weighted random amount is generated between the first specified minimum value of the prize pool and the first specified maximum value of the prize pool, wherein the function is configured to calculate first weighted random amounts that average over time substantially the first specified average value;

calculating, by the computing device, a second weighted random amount from the prize pool using the function, which calculates the second weighted random amount using the second specified minimum value, the second specified maximum value and the second specified average value, wherein the calculated second random amount is generated between the second specified minimum value of the prize pool and the second specified maximum value of the prize pool, wherein the function is configured to calculate second weighted random amounts that average over time substantially the second specified average value; and playing the game, wherein a final game outcome in the plurality of game outcomes is determined by the playing of the game; and if the final game outcome is one of the first ranked game outcome or the second ranked game outcome, awarding the player of the game the first random weighted amount from the prize pool if the final game outcome is the first ranked game outcome and awarding the player of the game the second weighted random amount if the final game outcome is the second ranked game outcome from the plurality of ranked game outcomes.

45. The method of claim 44, wherein the calculating of the first weight random amount and the second random amount is performed upon qualifying the player for the game.

46. A method of awarding payouts from a prize pool using a gaming device, the method comprising:

determining a programmer input of information based on an average value, minimum award value, and maximum award value, the average value being between the minimum award value and maximum award value;

determining a continuous function, the continuous function including one or more parameters ("parameterized continuous function"), wherein the one or more parameters are calculated using the information based on the average value, the minimum award value, and the maximum award value, wherein a variable of the parameterized continuous function is for a weighted random award value, wherein the parameterized continuous function calculates weighted random award values that average over time substantially the average value;

receiving, by the gaming device, a wager amount;

receiving an input to initiate game play; and qualifying the wager amount to win a weighted random award value;

calculating the weighted random award value by solving for the variable of the parameterized continuous function using a random number, wherein the weighted random award value is calculated from the variable, the calculated weighted random award value being between the minimum award value and the maximum award value; and awarding, using the gaming device, the weighted random award value calculated using the parameterized continuous function.

47. The method of claim 46, wherein the prize pool is fixed.

48. The method of claim 46, further comprising allocating a portion of the wager amount to the prize pool.

49. The method of claim 46, wherein the prize pool is progressive.

50. The method of claim 46, further comprising allocating a portion of non-gaming revenues to the prize pool.

51. The method of claim 46, wherein the parameterized continuous function that calculates weighted random awards in a continuous range of values from the minimum award value to the maximum award value.

52. The method of claim 46, wherein a value of the weighted random award value has not been stored before the calculation of the weighted random award value using the parameterized continuous function.

53. The method of claim 46, wherein the parameterized continuous function comprises an exponential function.

54. The method of claim 46, wherein awarding the weighted random award value is dependent on game outcome.

55. The method of claim 46, wherein awarding the weighted random award value is not dependent on game outcome.

56. The method of claim 46, wherein qualifying includes detecting a players card is inserted into the gaming device.

57. The method of claim 46, wherein, when a portion of the wager amount or non-gaming revenue contributed to the prize pool reaches at least one predetermined amount, the method further comprising triggering a bonus game to award the weighted random award value.

58. The method of claim 57, wherein when an amount of portions of wager amounts from the gaming device or one or more other gaming devices reaches at least one predetermined amount, triggering the bonus game to award at least one weighted random award value.

59. The method of claim 58, wherein once the bonus game is triggered, the method further comprising:

randomly selecting at least one of the gaming device and the one or more other gaming devices; and awarding the weighted random award value to the selected gaming device.

60. The method of claim 46, wherein awarding comprises displaying the weighted random award value to a player.

61. The method of claim 60, wherein the weighted random award value is displayed before or during game play.

62. The method of claim 46, wherein awarding comprises causing output of the weighted random award value at a device connected to the gaming device.

63. A system for providing a game using random payout from a prize pool, the system comprising:

a gaming device configured to receive a wager amount and an input to initiate game play; and a controller configured to:

determine a programmer input of information based on an average value, minimum award value, and maximum award value, the average value being between the minimum award value and maximum award value;

determine a continuous function, the continuous function including one or more parameters ("parameterized continuous function"), wherein the one or more parameters are calculated using the information based on the average value, the minimum award value, and the maximum award value, wherein a variable of the parameterized continuous function is for a weighted random award value, wherein the parameterized continuous function calculates weighted random award values that average over time substantially the average value qualify the wager amount to win a random award value;

calculate the weighted random award value by solving for the variable of the parameterized continuous function using a random number, wherein the weighted random award value is calculated from the variable, the weighted random award value being between the minimum award value and the maximum award value, wherein the gaming device is configured to award the random award value.

64. The system of claim 63, wherein a contribution rate is greater than the average value thereby increasing the prize pool.

65. The system of claim 63, wherein the prize pool is fixed.

66. The system of claim 63, wherein the prize pool is progressive.

67. The system of claim 63, wherein the controller is configured to allocate a portion of the wager amount to the prize pool.

68. The system of claim 67, wherein the controller is configured to allocate a portion of non-gaming revenues to the prize pool in addition to the portion of the wager amount.

69. The system of claim 63, further comprising allocating a portion of non gaming revenues to the prize pool.

70. The system of claim 63, wherein the parameterized continuous function calculates the random award values in a continuous range of values from the minimum award value to the maximum award value.

71. The system of claim 63, wherein a value of random award value has not been stored before the calculation of the weighted random award value using the parameterized continuous function.

72. The system of claim 63, wherein the parameterized continuous function comprises an exponential function.

73. An apparatus comprising:

one or more computer processors; and logic encoded in one or more computer readable storage media for execution by the one or more computer processors and when executed operable to:

determine a programmer input of information based on an average value, minimum award value, and maximum award value, the average value being between the minimum award value and maximum award value;

determine a continuous function, the continuous function including one or more parameters ("parameterized continuous function"), wherein the one or more parameters are calculated using the information based on the average value, the minimum award value, and the maximum award value, wherein a variable of the parameterized continuous function is for a weighted random award value, wherein the parameterized continuous function calculates weighted random award values that average over time substantially the average value;

receive a wager amount;

receive an input to initiate game play; and qualify the wager amount to win a weighted random award value, wherein the random award value is determined by solving for the variable of the parameterized continuous function, wherein the weighted random award value is calculated from the variable, the calculated random award value being between a minimum award value and a maximum award value; and award the weighted random award value calculated by the function.

74. An apparatus comprising:

one or more computer processors; and logic encoded in one or more computer readable storage media for execution by the one or more computer processors and when executed operable to:

determine a programmer input of information based on an average value, minimum award value, and maximum award value, the average value being between the minimum award value and maximum award value;

determine a continuous function, the continuous function including one or more parameters ("parameterized continuous function"), wherein the one or more parameters are calculated using the information based on the average value, the minimum award value, and the maximum award value, wherein a variable of the parameterized continuous function is for a weighted random award value, wherein the parameterized continuous function calculates weighted random award values that average over time substantially the average value; receive an indication to determine a random award value;

calculate the weighted random award value by solving for the variable of the parameterized continuous function using a random number, wherein the weighted random award value is calculated from the variable, the weighted random award value being between the minimum award value and the maximum award value; and cause awarding of the weighted random award value.

* * * * *